United States Patent [19]
Leonard

[11] 3,975,478
[45] Aug. 17, 1976

[54] METHOD FOR PRODUCING HIGHLY PERMEABLE ACRYLIC HOLLOW FIBERS

[75] Inventor: Richard L. Leonard, Cary, N.C.

[73] Assignee: Monsanto Company, St. Louis, Mo.

[22] Filed: Aug. 14, 1974

[21] Appl. No.: 497,437

[52] U.S. Cl. .............................. 264/41; 210/500 M; 264/177 F; 264/182; 264/206; 264/209; 428/398

[51] Int. Cl.² ..................... B29D 27/00; D01F 6/18

[58] Field of Search ............... 264/182, 177 F, 209, 264/206, 41; 428/398; 210/321, 500 R, 500 M, 505

[56] References Cited
UNITED STATES PATENTS

| | | | |
|---|---|---|---|
| 3,674,628 | 7/1972 | Fabre | 161/178 |
| 3,799,356 | 3/1974 | Salyer et al. | 264/182 |

Primary Examiner—Jay H. Woo
Attorney, Agent, or Firm—Russell E. Weinkauf

[57] ABSTRACT

A method is provided for fabricating asymmetric acrylic hollow fibers for use in separatory processes as a selective membrane. The fibers are highly permeable and exhibit a high degree of selectivity in discriminating mixtures into their various components. The fibers are formed by extruding an acrylic polymer solution through an annular orifice while simultaneously injecting a coagulating fluid into the bore of the fiber extrudate as it is formed. The extrusion may be directly into a coagulating bath maintained at a temperature of from 60° to 80°C. or alternatively the freshly extruded fiber may be first passed through an air space (evaporation zone) and thence into the coagulating bath. Following coagulation, the fibers are water washed to remove residual solvent.

9 Claims, No Drawings

METHOD FOR PRODUCING HIGHLY PERMEABLE ACRYLIC HOLLOW FIBERS

This invention provides a method for producing asymmetric acrylic tubular fibers which are useful as a selective membrane in various separatory processes. More particularly, the method provides a means for obtaining a highly permeable acrylic hollow fiber having a dense walled bore or highly selective inner skin with a porous skin on the outer periphery of the fiber.

There has been an ever-increasing interest in the use of hollow fibers or filaments in processes for separating the various components from both liquid and gaseous mixtures. For example, because of inherent advantages over the more conventional planar membranes, hollow fiber membranes have become the selective membrane of choice in reverse osmosis procedures employed in the desalination of water. One mode of operation with hollow filaments or fibers involves collecting relatively salt free water as permeate from one side of the hollow membrane, e.g., the outer fiber surface, while passing the saline or brakish water through the fiber bore under pressure such that water permeates the wall of the hollow fibers, while restricting the flow in that direction of the saline constituents. Hollow fibers have the great advantage over flat membranes in that permeation or available surface area is immensely increased thereby substantially reducing pressure vessel space requirements. Moreover, support members are not required since the hollow fiber geometry is self-supporting.

Another recently-developed use for hollow fiber membranes, and especially those derived from acrylic polymers, is in medical dialysis where the separatory membrane functions as an artificial kidney to effect blood purification. In operation the blood passes through the bore of the hollow fiber with a dialysant on the outside. Then materials, such as urea, water and creatin flow either way depending upon their relative concentration. In such application the membrane must retain the key blood components while allowing other constituents to pass freely. Thus, for artificial kidney fibers, there is substantial advantage in having the controlling skin on the inner wall.

Still another application for highly permeable hollow fibers derived from acrylic polymers is the concentration of aqueous ethanol vapor by using a vacuum to pull one component (water) through the membrane leaving behind a mixture richer in alcohol. Were the membrane not present the more volatile alcohol would be carried off. This process of separating vapors with a membrane is called pervaporation and has the potential for reducing the energy requirements for azeotropic and other distillations requiring high reflux ratios.

In addition to the aforementioned procedures, there are a number of other separations which are necessary in certain industrial operations where hollow fiber membranes of the type contemplated by this invention may also be advantageously employed. In all such applications, the process economics are highly dependent upon the transport rate of various components across the membrane wall and the ability of the membrane to discriminate various components. That is, an efficient membrane must not only be highly permeable but also possess a high degree of selectivity. Although hollow acrylic fibers have been produced by prior methods with acceptable selectivity, they have for the most part been found wanting with respect to the level of permeability required for efficient operation as a selective membrane. The problem has been an inability to obtain the necessary fiber morphology by previous fabricating procedures. It is, therefore, a principal object of this invention to provide a method for producing hollow fibers from acrylic polymers in which the permeability is substantially improved over that attainable heretofore while preserving the property of high selectivity.

Broadly speaking, acrylic hollow fibers having the afore-noted combination of properties are produced according to this invention by extruding a solution of acrylic polymer through an annular orifice to shape the hollow fiber while simultaneously injecting a coagulating fluid into the bore of the fiber as it is formed. The extrusion may be directly into a coagulation bath maintained at a temperature of from 60° to 80°C. (wet spinning) or alternatively the freshly extruded fiber may be first passed through an air space (evaporation zone) over a time period of from about 0.01 to 1.0 second and thence into the coagulation bath (dry jet-wet spinning). The coagulated fiber is then water washed to remove residual solvent and finally collected on take-up rolls. Since the resulting fiber product must be kept wet at all times, it is not dried. As is the case in wet spinning, the general principles of dry jet-wet spinning are well known in the art and are described in a number of publications including U.S. Pat. No. 3,724,672.

Polymers which are suitable for use in the present invention include the homopolymer of acrylonitrile or any copolymer thereof which contains at least 70 percent by weight of acrylonitrile with the balance being one or more monomeric compounds copolymerizable with acrylonitrile. It is necessary, of course, that the polymer be fiber-forming. That is, it should have a molecular weight in the range of from about 30,000 to 200,000 as calculated from viscosity measurements taken in dimethyl formamide. Useful polymers of the type contemplated are well known in the prior art and need no further identification.

In preparing the polymer solution (spin dope) any of the solvents conventionally used for this purpose may be employed. Suitable examples include dimethylacetamide, dimethylformamide and dimethylsulfoxide, with dimethylacetamide generally being of preference. The spinning solutions should have a solids or solute content of from about 20–35 percent based on the weight of the solution.

Since the inner skin wall is attained by injection of a coagulating medium into the fiber bore as it is formed, the injection fluid must have some coagulating potential for the spin dope; otherwise, the fiber bore will not be continuous. Although selection of the injection fluid will depend to some extent on spinning dope being processed, it has been found that water is generally applicable and that good results are usually obtained when employing from 20 to 70 percent aqueous solutions of low molecular weight alcohols such as ethanol or ethylene glycol. Although other coagulants could be used these have been found to be especially suitable since only small quantities are required and the resulting coagulation rates are quite rapid.

The nature of the coagulation bath will depend upon whether dry jet-wet spinning or wet spinning procedures are used. When employing dry jet-wet spinning the bath may consist entirely of a non-solvent for the fiber-forming material, such as water, although small quantities of solvent may be present. In the case of wet spinning some solvent must be present in addition to a non-solvent. Suitable solvents, such as dimethylsulfoxide, dimethylformamide and dimethylacetamide and the concentrations required are well known in the art of wet spinning. Since the temperature of the coagulation bath is considered a critical parameter in achieving the fiber morphology attainable by this invention, it is necessary that it be maintained in the range of from 60° to 80°C.

Since the fibers produced in accordance with this invention are tubular or hollow, i.e., they have an axially disposed cylindrical bore which extends throughout the fiber length, it is necessary that the spin dope be extruded through a shaping orifice that will form this structure, such as an annular orifice. For best results, the orifice contains a capillary tube coaxially disposed therein for injecting the coagulating fluid into the bore of the hollow fiber as it is formed.

To further illustrate the invention the following examples are presented.

EXAMPLE I

This example illustrates the production of hollow acrylic fibers in accordance with this invention when a dry jet-wet spinning procedure is followed. Since an excessively high evaporation rate through the air space between the spinneret and the coagulating bath tends to give an outer skin which is denser than desired, the evaporation rate was hindered by enclosing the air zone with a chimney. The air space was approximately 6 inches in length. The process conditions are tabulated below.

| | |
|---|---|
| Polymer: | Acrylonitrile-vinyl acetate copolymer approximately 93–97% by weight and $N_{sp}$ 0.150 |
| Spin Dope: | 20% polymer and 80% dimethylacetamide, extruded at 6.3 cc/min |
| Spinneret: | Tube-in-orifice hollofil with orifice diameter 28 mils; injection tube 12 mils outside diameter and 6 mils inside diameter |
| Injection Fluid: | 20% aqueous solution of ethylene glycol |
| Evaporation: | Chimney (3 inch inside diameter and 6 inch length) attached to spinneret and immersed ⅛ inch in coagulation bath |
| Coagulation Bath: | 55% aqueous solution of dimethylacetamide at 80°C. Fiber immersion length approximately 4 ft. |
| 1st Wash Rolls: | Water at 80°C.; 40 ft/min |
| 2nd Wash Rolls: | Water at 50°C.; 40 ft/min |
| 3rd Wash Rolls | Water at room temperature; 40 ft/min |
| Fiber Dimensions: | Outside diameter 760 microns; inside diameter 314 microns |

EXAMPLE II

This example illustrates the method of this invention when a wet spinning procedure is employed. The spin dope of Example I was extruded through the same spinneret. However, the spinneret was immersed in the coagulation bath such that the freshly extruded filament issued from the shaping orifice horizontally to the surface of the coagulation bath and at about one inch below the surface. With the exception of the following, other conditions paralleled those of Example I.

| | |
|---|---|
| Injection Fluid: | 70% aqueous ethyl alcohol |
| Coagulation Bath: | 80% aqueous dimethylacetamide at 70°C. |
| 1st Wash: | Water at 37°C. |
| Fiber Dimensions: | Outside diameter 865 microns; inside diameter 380 microns |

Samples of hollow fibers obtained from the above-described runs were tested under pervaporation conditions with the outside of the hollow fiber exposed to a vapor of 55% aqueous ethyl alcohol and the bore of the fiber evacuated using a vacuum pump. The fluids flowing across the fiber wall into the bore under the pressure differential of approximately one atmosphere were then condensed in a trap at dry ice temperatures. Analysis of the condensed liquids show that it was essentially pure water. The transport rate of water across the hollow fiber membranes was about 3 gallons per square feet of inside membrane area per day at a separation factor of 56. Separation factor is defined by the equation:

$$SF = \frac{(EtOH)_F (H_2O)_P}{(EtOH)_P (H_2O)_F}$$

where: (EtOH) is weight percent ethanol in the Feed and Product streams, respectively, and likewise ($H_2O$) is weight percent water.

Transmission electron micrographs of freeze dried fibers (Example I) show that the densest region in the wall morphology occurs at the inner wall and the internal wall contains many vacuoles (macro-voids) which do not penetrate the inner wall.

It will be understood that the foregoing description and examples are only illustrative of the present invention and it is not intended that the invention be limited thereto. All substitutions, alterations and modifications which come within the scope of the following claims or to which this invention is readily susceptible without departing from the spirit and scope of this disclosure are considered part of the invention.

I claim:

1. A method for forming an asymmetric hollow acrylic fiber having an axially disposed cylindrical bore extending throughout the fiber length and characterized by a high permeability and selectivity when used as a separatory membrane, the method which comprises: extruding a solution of fiber-forming acrylic polymer which contains at least 70 percent by weight acrylonitrile through a shaping orifice to form a hollow fiber while simultaneously injecting a coagulating fluid into the fiber bore as it is formed, causing the extruded fiber to contact a coagulation bath maintained at a temperature of from about 60° to 80°C. immediately upon exiting from said shaping orifice and thereafter washing said hollow fiber with water to remove residual solvent.

2. The method in accordance with claim 1, wherein said fiber-forming polymer is a copolymer of acrylonitrile and vinyl acetate.

3. The method in accordance with claim 1, wherein said injected coagulating fluid is selected from the group consisting of water, an aqueous solution of ethanol and an aqueous solution of ethylene glycol.

4. The method in accordance with claim 1, wherein said coagulation bath consists of an aqueous solution of dimethylacetamide.

5. A method for forming an asymmetric hollow acrylic fiber having an axially disposed cylindrical bore extending throughout the fiber length and characterized by a high permeability and selectivity when used as a separatory membrane, the method which comprises: extruding a solution of fiber-forming acrylic polymer which contains at least 70 percent by weight acrylonitrile through a shaping orifice to form a hollow fiber while simultaneously injecting a coagulating fluid into the fiber bore as it is formed, causing the extruded fiber to pass through a zone of air for a period of from about 0.01 to 1.0 second upon emerging from said shaping orifice followed by passage through a coagulation bath maintained at a temperature of from 60° to 80°C., and thereafter washing said hollow fiber with water to remove residual solvent.

6. The method in accordance with claim 5, wherein said fiber-forming polymer is a copolymer of acrylonitrile and vinyl acetate.

7. The method in accordance with claim 5, wherein said injected coagulating fluid is selected from the group consisting of water, an aqueous solution of ethanol and an aqueous solution of ethylene glycol.

8. The method in accordance with claim 5, wherein said coagulation bath consists of an aqueous solution of dimethylacetamide.

9. The method in accordance with claim 5, wherein said coagulation bath consists of water.

* * * * *